(12) United States Patent
Chen (10) Patent No.: US 10,137,968 B2
(45) Date of Patent: Nov. 27, 2018

(54) STONE DUMPING VESSEL HAVING SYMMETRICAL STONE COMPARTMENTS

(71) Applicant: Ship and Ocean Industries R&D Center, New Taipei (TW)

(72) Inventor: Lin-Fu Chen, New Taipei (TW)

(73) Assignee: SHIP AND OCEAN INDUSTRIES R&D CENTER, New Taipei (TW)

(*) Notice: Subject to any disclaimer, the term of this patent is extended or adjusted under 35 U.S.C. 154(b) by 21 days.

(21) Appl. No.: 15/401,273

(22) Filed: Jan. 9, 2017

(65) Prior Publication Data

US 2018/0194440 A1 Jul. 12, 2018

(51) Int. Cl.
| | | |
|---|---|---|
| *B63B 27/00* | (2006.01) | |
| *B63B 27/22* | (2006.01) | |
| *B63B 35/44* | (2006.01) | |
| *B65G 67/60* | (2006.01) | |
| *E02D 29/09* | (2006.01) | |
| *E02D 27/52* | (2006.01) | |
| *B65G 49/00* | (2006.01) | |
| *B65G 11/02* | (2006.01) | |

(52) U.S. Cl.
CPC ............ *B63B 27/22* (2013.01); *B63B 35/44* (2013.01); *B65G 11/023* (2013.01); *B65G 49/00* (2013.01); *B65G 67/603* (2013.01); *E02D 27/52* (2013.01); *E02D 29/06* (2013.01); *B65G 2201/02* (2013.01); *B65G 2812/12* (2013.01); *B65G 2814/0397* (2013.01)

(58) Field of Classification Search
CPC ....... B63B 27/22; B63B 35/44; B65G 11/023; B65G 49/00; B65G 67/603; E02D 27/52; E02D 29/06; E02D 15/10

USPC .................................................. 414/141.8
See application file for complete search history.

(56) References Cited

U.S. PATENT DOCUMENTS

| | | | |
|---|---|---|---|
| 616,780 A | * | 12/1898 | Fraser |
| 678,108 A | * | 7/1901 | Johnson |
| 2,815,134 A | * | 12/1957 | Borrowdale ............ B63B 27/22 198/533 |

(Continued)

FOREIGN PATENT DOCUMENTS

WO    WO 2009/020385    *    2/2009    ............. B63B 39/00

*Primary Examiner* — Lynn E Schwenning
(74) *Attorney, Agent, or Firm* — Ming Chow; Sinorica, LLC (57) ABSTRACT

A stone dumping vessel having symmetrical stone compartments includes a hull, a stone conveying unit, and an oblique fallpipe unit. The hull has a control cabin. A cannula compensating device of the oblique fallpipe unit is disposed on a side of the hull and connected with a fallpipe. Two sides of the control cabin are symmetrically provided with the stone compartments and dynamic positioning (DP) system cabins, respectively. The stone compartments are operated independently for automatically unloading stones to the stone conveying unit disposed at a lower center thereof. The stones are conveyed by independent conveyor systems disposed at the left and right of the control cabin to the fallpipe. The dynamic positioning (DP) system cabins and the cannula compensating device are adapted to position the hull and the fallpipe respectively so that the stone dumping vessel having symmetrical stone compartments can achieve high accuracy of stone dumping.

6 Claims, 8 Drawing Sheets

(56) References Cited

U.S. PATENT DOCUMENTS

| | | | | |
|---|---|---|---|---|
| 3,601,268 A | * | 8/1971 | Bethge | B63B 27/22 |
| | | | | 114/120 |
| 5,342,148 A | * | 8/1994 | Huete | B63B 21/50 |
| | | | | 405/203 |
| 5,741,106 A | * | 4/1998 | Sridhar | B63B 27/22 |
| | | | | 198/532 |
| 8,628,287 B2 | * | 1/2014 | Vehmeijer | B63B 35/4413 |
| | | | | 166/355 |

* cited by examiner

STONE DUMPING VESSEL HAVING SYMMETRICAL STONE COMPARTMENTS

FIELD OF THE INVENTION

The present invention relates to a stone dumping vessel, and more particularly to a stone dumping vessel having symmetrical stone compartments.

BACKGROUND OF THE INVENTION

Stone dumping vessels are employed to dump and often also transport stones of various sizes and other suitable aggregate material for offshore and coastal protection applications. The existing stone dumping technology includes a gripping type and a side-tipping type. As the former, a vessel having a large platform is used to transport stones, and an excavator is mounted on the large platform. The vessel transports the stones to the work place, and the excavator dumps the stones to the work place. However, the vessel transports a small amount of stones, and its conditions to withstand wind waves are poor. Through the excavator to dump the stones, the stones fall by gravity and may drift in the water, resulting in poor accuracy of stone dumping. As the latter, a vessel is provided with an excavator, a side fallpipe, and a detection frame. When the vessel transports stones to the work site, the side fallpipe and the detection frame are placed into the water, and the excavator delivers the stones to the side fallpipe to complete the stone dumping operation. Through the side fallpipe, the accuracy of stone dumping can be improved.

However, the latter only slightly improves the accuracy of stone dumping. Moreover, the vessel transports a small amount of stones, and its conditions to withstand wind waves are poor. When the stone are gradually dumped into the water, the ballast of the vessel is uneven and the vessel may list to one side to change the position of the side fallpipe, which will greatly affect the accuracy of stone dumping. Once the accuracy of stone dumping is low, it will lead to an increase of the expected stones and lengthen the operation time and increase the operating costs. Therefore, the conventional stone dumping technology takes a lot of materials and labor and is time-consuming. Accordingly, the inventor of the present invention has devoted himself based on his many years of practical experiences to solve these problems.

SUMMARY OF THE INVENTION

The primary object of the present invention is to provide a stone dumping vessel having symmetrical stone compartments which can achieve high accuracy of stone dumping and has the advantages of saving material, saving time, saving labor and saving cost.

In order to achieve the aforesaid object, the stone dumping vessel having symmetrical stone compartments of the present invention comprises a hull, a stone conveying unit, and an oblique fallpipe unit. The hull has a control cabin. Two sides of the control cabin are symmetrically provided with the stone compartments, respectively. The stone compartments each have a compartment room to accommodate stones of various sizes and types. A bottom of the compartment room has a funnel-like shape for automatically unloading the stones. A midship portion of the hull is provided with conveyor systems respectively corresponding to the stone compartments for automatically conveying the stones of the stone compartments to the control cabin. The stone compartments are operated independently. The hull is provided with a pair of dynamic positioning (DP) system cabins symmetrically disposed at the two sides of the control cabin for positioning the hull. The stone conveying unit is disposed in the control cabin and connected with the conveyor systems. The oblique fallpipe unit includes a cannula compensating device. The cannula compensating device is disposed on a side of the hull. The oblique fallpipe unit further includes a fallpipe. The fallpipe is mounted to the cannula compensating device. The cannula compensating device is able to position the fallpipe and connect the fallpipe with the stone conveying unit.

Thereby, the conveyor systems cooperate with the stone conveying unit to automatically convey the stones to the fallpipe, and the stone compartments are symmetrically disposed at the two sides of the control cabin, and the stones of different sizes and types are separately stored in the storage rooms. According to the demand, one of the stone compartments is operated independently or the stone compartments are simultaneously operated. The dynamic positioning (DP) system cabins and the cannula compensating device are adapted to position the hull and the fallpipe, respectively. The stone dumping vessel having symmetrical stone compartments can achieve high accuracy of stone dumping and has the advantages of saving material, saving time, saving labor and saving cost.

DETAILED DESCRIPTION OF THE PREFERRED EMBODIMENTS

Embodiments of the present invention will now be described, by way of example only, with reference to the accompanying drawings.

Figure 1:
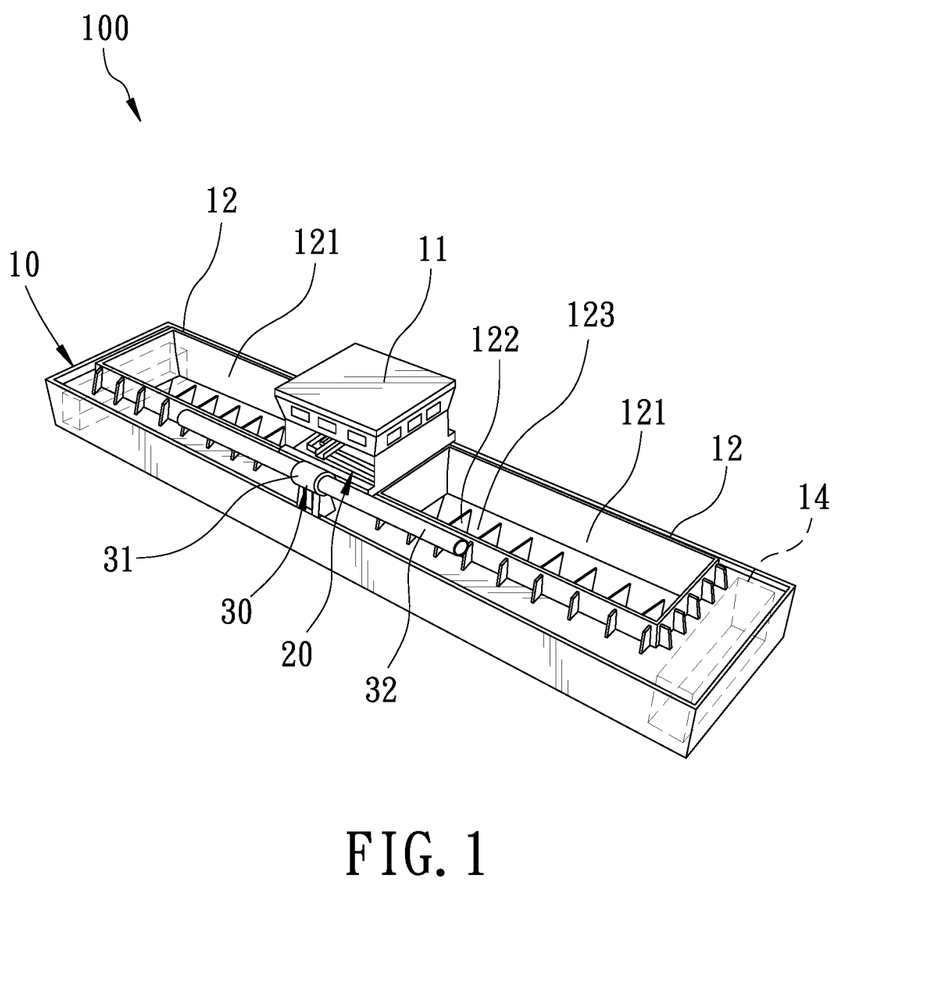
FIG. 1 is a perspective view of the present invention, showing the fallpipe not applied.
Figure 2:
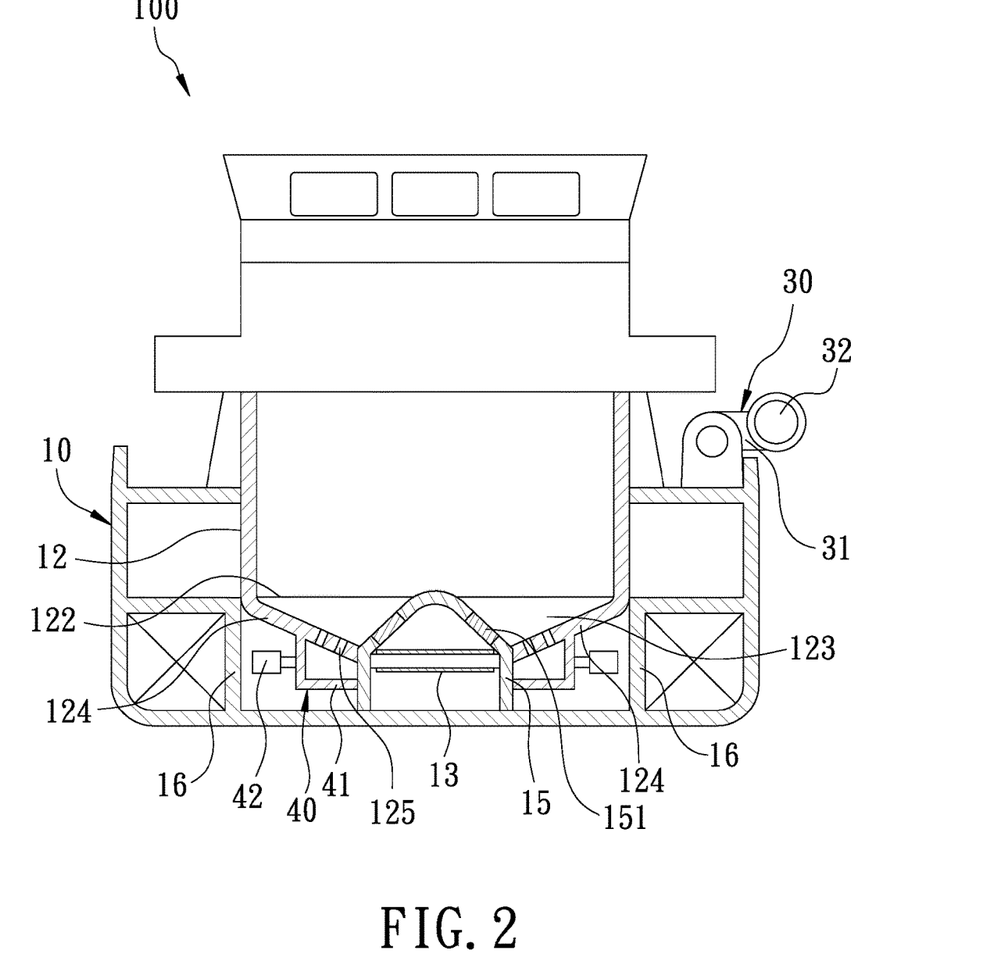
FIG. 2 is a sectional view of the stone compartments of the present invention.
Figure 3:
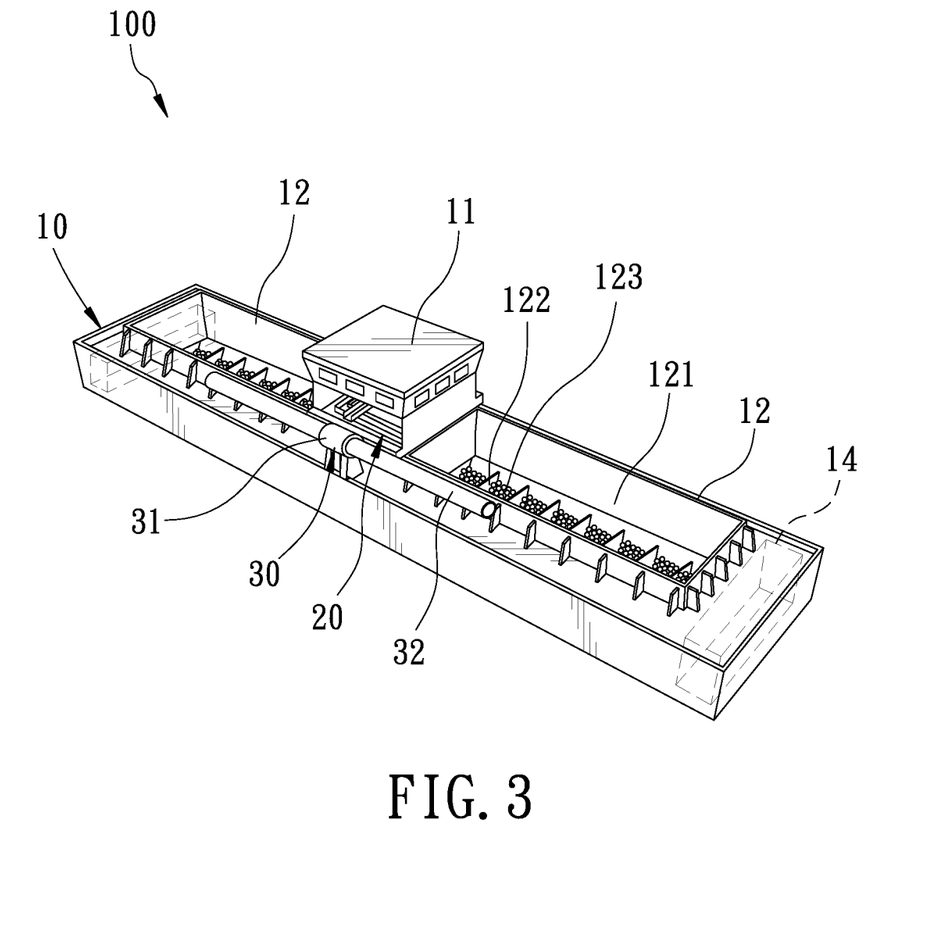
FIG. 3 is a schematic view of the present invention when in use, showing the fallpipe not applied.

FIG. 1 is a perspective view of the present invention, showing the fallpipe not applied. FIG. 2 is a sectional view of the stone compartments of the present invention. FIG. 3 is a schematic view of the present invention when in use, showing the fallpipe not applied. The present invention discloses a stone dumping vessel 100 having symmetrical stone compartments comprises a hull 10, a stone conveying unit 20, an oblique fallpipe unit 30, and a plurality of drainage units 40.

The hull 10 has a control cabin 11. Two sides of the control cabin 11 are symmetrically provided with stone compartments 12, respectively. The stone compartments 12 each have a compartment room 121 to accommodate stones of various sizes and types. The bottom of the compartment room 121 has a funnel-like shape for automatically unloading the stones. The midship portion of the hull 10 is provided with conveyor systems 13 respectively corresponding to the stone compartments 12 for automatically conveying the stones of the stone compartments 12 to the control cabin 11. The stone compartments 12 can be operated independently. The hull 10 is provided with a pair of dynamic positioning (DP) system cabins 14 symmetrically disposed at the two sides of the control cabin 11 for positioning the hull 10. In the present invention, the conveyor system 13 is disposed at the center of the stone compartment 12 arranged along the longitudinal direction of the stone compartment 12. An outer cover 15 is provided above the conveyor system 13. The compartment room 121 is provided with a plurality of dumping partitions 122 therein. The dumping partitions 122 are spaced and disposed at two sides of the outer cover 15 along the longitudinal direction of the stone compartment 12 so that two sides of the conveyor system 13 are formed with a plurality of storage rooms 123, respectively. The outer cover 15 is provided with gates 151 corresponding to the storage rooms 123, respectively. Furthermore, the stone compartment 12 has two side walls 124 which are parallel to the longitudinal direction of the conveyor system 13 and symmetrically disposed at two sides of the conveyor system 13. The side walls 124 are each inclined upwardly and outwardly from one end thereof adjacent to the conveyor system 13, and are provided with a plurality of drainage holes 125 adjacent to the conveyor system 13. The hull 10 is further provided with a plurality of ballast compartments 16 which are symmetrically disposed at two sides of the stone compartments 12 respectively for water inflow or drainage corresponding to stone dumping of the stone compartments 12 so that the stone dumping vessel 100 can achieve ballast balance.

Figure 6:
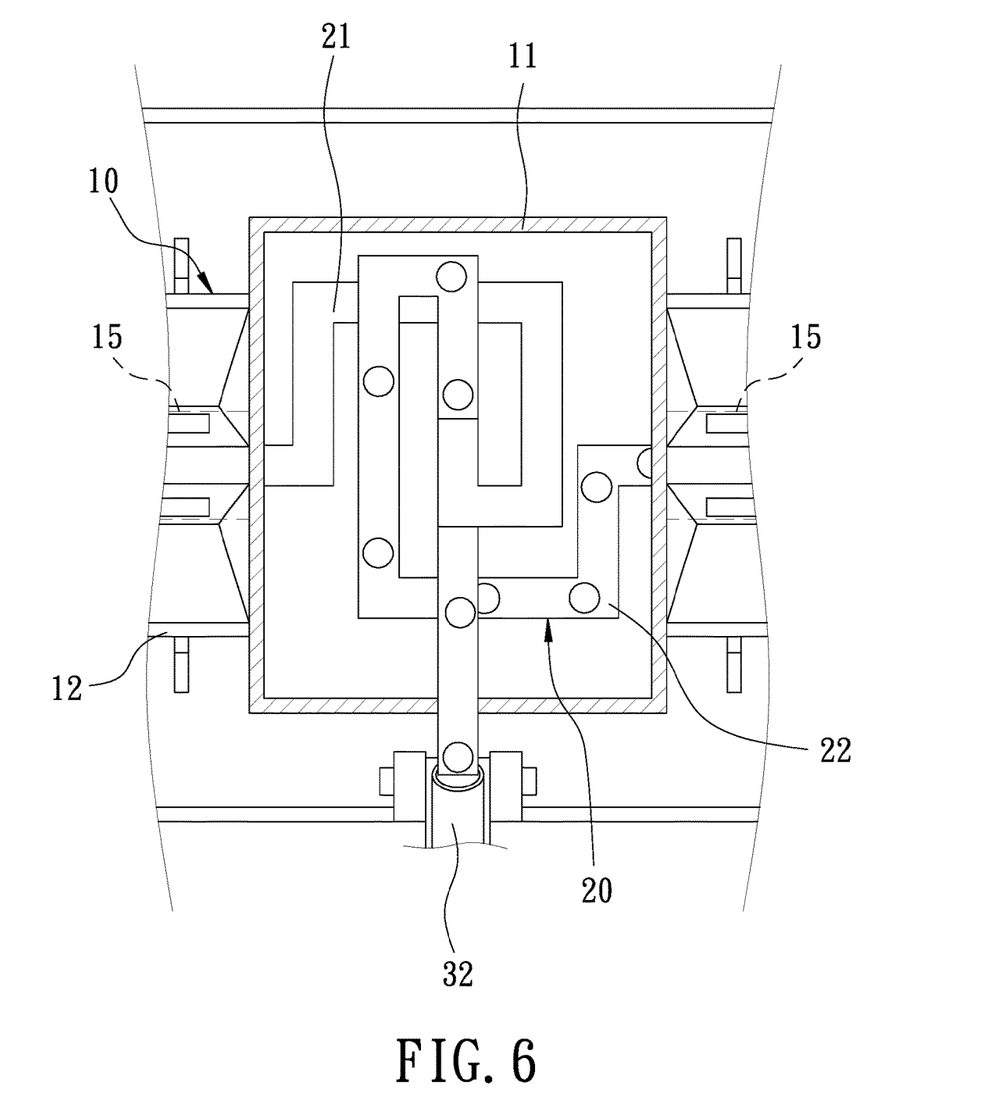
FIG. 6 is a schematic view of the present invention when in use, showing that the stone conveying unit conveys the stones.

The stone conveying unit 20 is disposed in the control cabin 11 and connected with the conveyor systems 13. As shown in FIG. 6, the stone conveying unit 20 includes a first rail 21 and a second rail 22. One end of each of the first rail 21 and the second rail 22 is connected to a corresponding one of the conveyor systems 15. The other end of the first rail 21 is connected to the second rail 22. The other end of the second rail 22 is telescopic.

Figure 4:
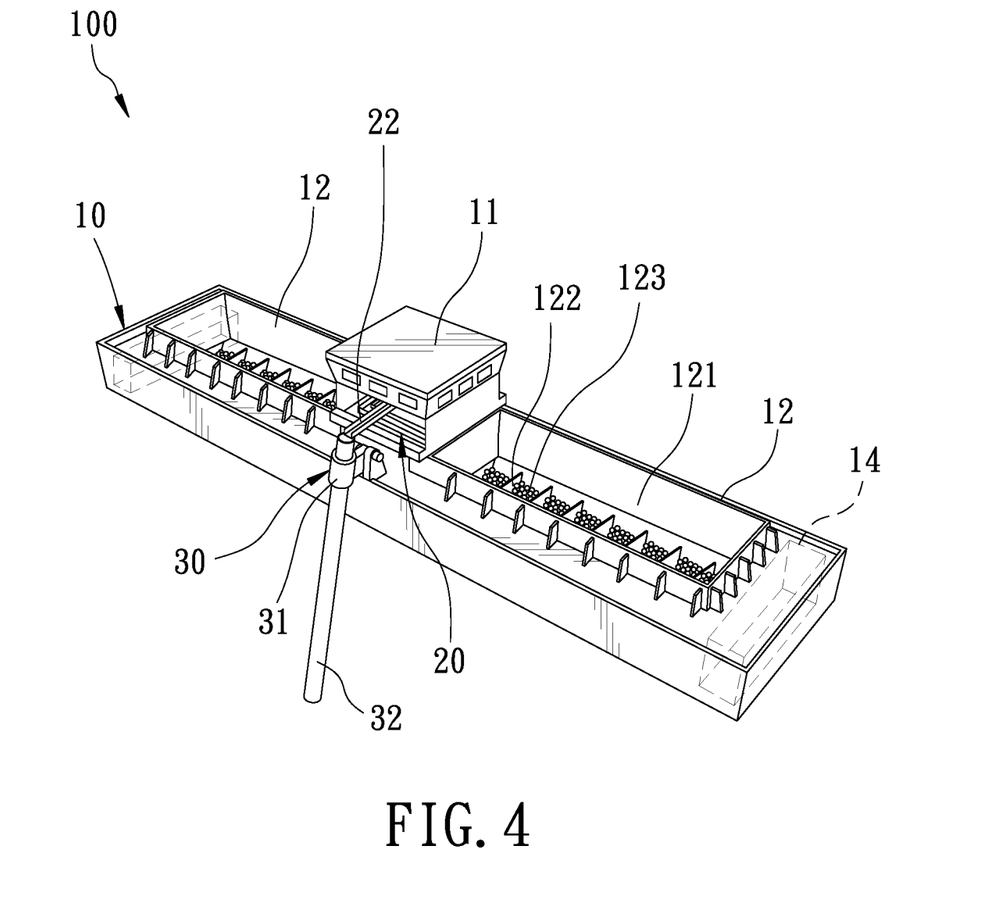
FIG. 4 is a schematic view of the present invention when in use, showing the fallpipe applied.

The oblique fallpipe unit 30 includes a cannula compensating device 31. The cannula compensating device 31 is disposed on the side of the hull 10. The oblique fallpipe unit 30 further includes a fallpipe 32. The fallpipe 32 is inserted through the cannula compensating device 31. The cannula compensating device 31 is adapted to rotate and slide the fallpipe 32 to a stone dumping position in the water to position the fallpipe 32, and the fallpipe 32 is connected with the stone conveying unit 20. As shown in FIG. 4, in the present invention, when the fallpipe 32 is positioned, the other end of the second rail 22 is telescopic and selectively connectable to the fallpipe 32.

The plurality of drainage units 40 are disposed correspondingly to the side walls 124 under the bottoms of the side walls 124 adjacent to the conveyor system 13. Each drainage unit 40 includes a drain compartment 41. The drain compartment 41 is connected with a drain pump 42. The drainage holes 125 are in communication with the drainage compartment 41.

Figure 5:
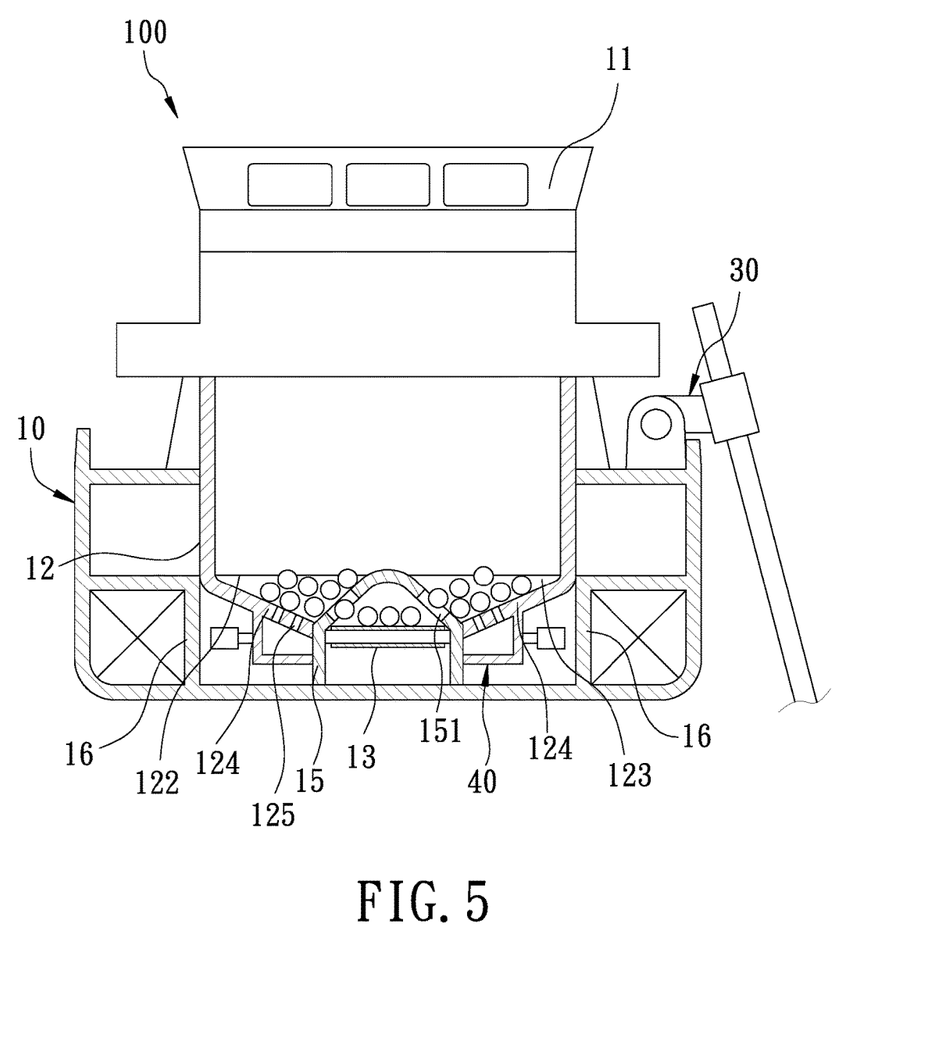
FIG. 5 is a schematic view of the present invention when in use, showing that the gates are opened.

Please refer to FIG. 4 and FIG. 5, in cooperation with FIG. 1, before the operation of stone dumping, the stone are placed in the compartment rooms 121 and separately stored in the storage rooms 123 according to different sizes and types. When the stone dumping vessel 100 having symmetrical stone compartments transports the stones to the work site, the cannula compensating device 31 is operated to rotate the fallpipe 32 by 90 degrees, and the fallpipe 32 is slid toward the stone dumping position to position the fallpipe 32. The fallpipe 32 is positioned as shown in FIG. 4. At this time, the second rail 22 extends out toward the fallpipe 32 so that one end of the fallpipe 32 is connected with the second rail 22. The other end of the fallpipe 32 is in the water and positioned at the stone dumping position for implementing the operation of stone dumping.

Figure 7:
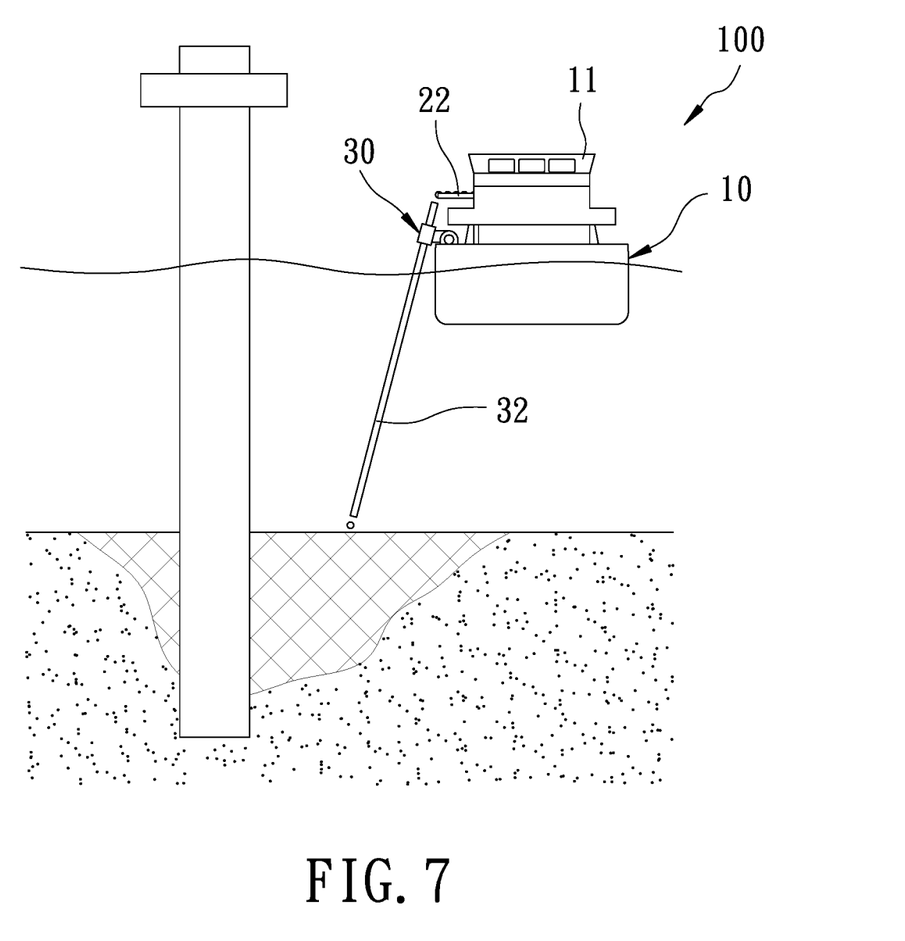
FIG. 7 is a schematic view of the present invention when in use, showing stone dumping.

Referring to FIGS. 5 to 7, for the stone dumping operation, each of the stone compartments 12 is independently operated. One of the stone compartments 12 can be selected to work independently in accordance with the requirements of stone sizes, hull ballast, etc., or the stone compartments 12 are operated simultaneously. According to the demand, several of the gates 151 may be selectively opened, so that the respective storage rooms 123 corresponding to the gates 151 are respectively communicated with the conveyor system 13. The stones in the storage rooms 123 automatically drop to the conveyor system 13 through the inclined design of the side walls 124, and the stones are conveyed to the first rail 21 or the second rail 22 through the conveyor system 13. Finally, the stones are dumped into the area to be filled along the fallpipe 32.

Figure 8:
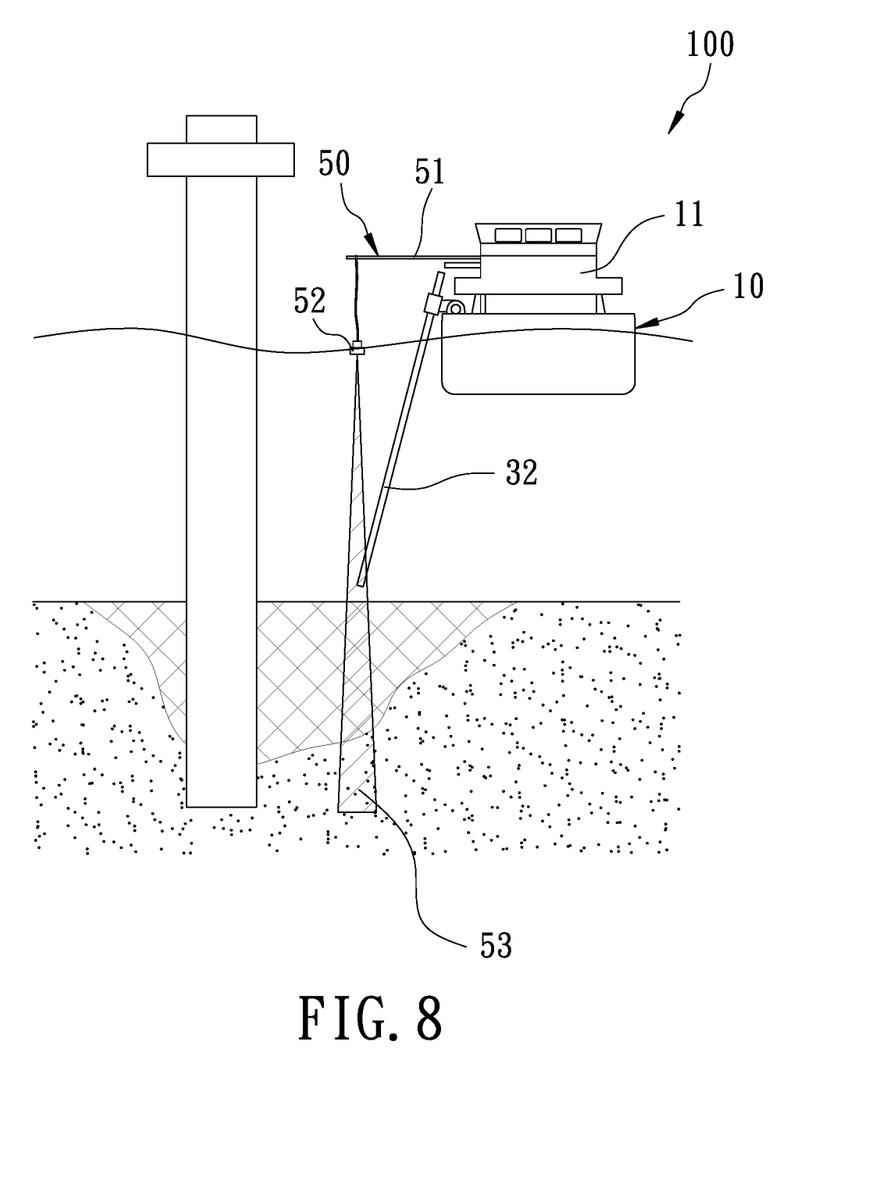
FIG. 8 is a schematic view of the present invention in a measuring state.

Referring to FIG. 8, the stone dumping vessel 100 having symmetrical stone compartments further comprises a measuring system 50. The measuring system 50 comprises a boom 51. One end of the boom 51 is connected to the control cabin 11 and can be extended outwardly from the control cabin 11. The other end of the boom 51 is provided with a measuring instrument 52. After completion of the stone dumping operation, the measuring instrument 52 is suspended from the boom 51 to float on the water corresponding in to the stone dumping position. Meanwhile, the measuring instrument 52 will emit a measuring wave beam 53 towards the bottom of the water in cooperation with an RTK-GPS system to assist in the measurement and transmission of information, and the measurement result is returned by 3D modeling technology for the user to check the stone dumping result immediately.

It is worth mentioning that the design of the stone compartments 12 symmetrically disposed at the two sides of the control cabin 11 enhances the balance of the stone dumping vessel 100 on the water so as to improve the accuracy of stone dumping.

It is worth mentioning that because the dynamic positioning (DP) system cabins 14 are symmetrically disposed at the two sides of the control cabin 11, when the hull 10 is disturbed by wind waves, the dynamic positioning (DP) system cabins 14 compensate for the deflection of the hull 10 caused by wind waves and controls the hull 10 within a tolerable deviation position to position the hull 10, such that the stone dumping accuracy is within two meters of the diameter, thereby improving the accuracy of stone dumping.

It is worth mentioning that when the oblique fallpipe unit 30 is disturbed by wind waves or ups and downs of the hull 10, because the fallpipe 32 is inserted through the cannula compensating device 31 and controlled by the cannula compensating device 31, the cannula compensating device 31 compensates for the deviation of the fallpipe 32 due to wind waves or ups and downs of the hull 10 to position the fallpipe 32, thereby increasing the accuracy of stone dumping.

It is worth mentioning that the ballast compartments 16 are automatically filled with water or drained when the stone compartments 12 dump stones respectively to cause an uneven ballast of the stone dumping vessel 100, so that the stone dumping vessel 100 is ballast-balanced.

It is worth mentioning that when the compartment rooms 121 are inadvertently fed with water, the water will flow to the drainage holes 124 by the inclined arrangement of the side walls 124 and into the drainage compartments 41 to be drained out through the drainage pumps 42.

Thereby, the conveyor systems 13 cooperate with the stone conveying unit 20 to automatically convey the stones to the fallpipe 32, and the stone compartments 12 are symmetrically disposed at the two sides of the control cabin 11, and the stones of different sizes and types are separately stored in the storage rooms 123. According to the demand, one of the stone compartments 12 is operated independently or the stone compartments 12 are simultaneously operated. The dynamic positioning (DP) system cabins 14 and the cannula compensating device 31 are adapted to position the hull 10 and the fallpipe 32, respectively. The measuring system 50 is adapted to instantly review the stone dumping result, so that the stone dumping vessel 100 can achieve high accuracy of stone dumping. The stone dumping vessel 100 having symmetrical stone compartments has the advantages of saving material, saving time, saving labor and saving cost.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A stone dumping vessel having symmetrical stone compartments, comprising:
   a hull, having a control cabin, two sides of the control cabin being symmetrically provided with the stone compartments respectively, the stone compartments each have a compartment room to accommodate stones of various sizes and types, a bottom of the compartment room having a funnel shape for automatically unloading the stones, a midship portion of the hull being provided with conveyor systems respectively corresponding to the stone compartments for automatically conveying the stones of the stone compartments to the control cabin, the stone compartments being operated independently, the hull being provided with a pair of dynamic positioning (DP) system cabins symmetrically disposed at the two sides of the control cabin for positioning the hull;
   a stone conveying unit, disposed in the control cabin and connected with the conveyor systems;
   an oblique fallpipe unit, including a cannula compensating device, the cannula compensating device being disposed on a side of the hull, the oblique fallpipe unit further including a fallpipe, the fallpipe being mounted to the cannula compensating device, the cannula compensating device being able to position the fallpipe and connect the fallpipe with the stone conveying unit;
   thereby, the conveyor systems cooperating with the stone conveying unit to automatically convey the stones to the fallpipe, the stone compartments being symmetrically disposed at the two sides of the control cabin and independently operated, and the dynamic positioning (DP) system cabins and the cannula compensating device being adapted to position the hull and the fallpipe respectively so that the stone dumping vessel can achieve high accuracy of stone dumping; and
   the stone conveying unit including a first rail and a second rail, one end of each of the first rail and the second rail being connected to a corresponding one of the conveyor systems, another end of the first rail being connected to the second rail, and another end of the second rail being telescopic and selectively connectable to the fallpipe.

2. The stone dumping vessel having symmetrical stone compartments as claimed in claim 1, wherein each conveyor system is disposed at a center of a corresponding one of the stone compartments arranged along a longitudinal direction of the stone compartment, an outer cover is provided above each conveyor system, the compartment room is provided with a plurality of dumping partitions therein, the dumping partitions are spaced and disposed at two sides of the outer cover along the longitudinal direction of the stone compartment so that two sides of each conveyor system are formed with a plurality of storage rooms respectively, and the outer cover is provided with gates corresponding to the storage rooms respectively.

3. The stone dumping vessel having symmetrical stone compartments as claimed in claim 1, wherein each stone compartment has two side walls which are parallel to a corresponding one of the conveyor systems and symmetrically disposed at two sides of the conveyor system, and the side walls are each inclined upwardly and outwardly from one end thereof adjacent to the conveyor system.

4. The stone dumping vessel having symmetrical stone compartments as claimed in claim 3, further comprising a plurality of drainage units disposed corresponding to the side walls under bottoms of the side walls adjacent to the conveyor system, each drainage unit including a drain compartment, the drain compartment being connected with a drain pump, the side walls being provided with a plurality of drainage holes corresponding to the drain compartment, the drainage holes being in communication with the drainage compartment.

5. The stone dumping vessel having symmetrical stone compartments as claimed in claim 1, further comprising a measuring system, the measuring system including a boom, one end of the boom being connected to the control cabin and able to extend outwardly from the control cabin, another end of the boom being provided with a measuring instrument suspended from the boom, the measuring instrument being able to emit a measuring wave beam for the measuring system to report a stone dumping result instantly.

6. The stone dumping vessel having symmetrical stone compartments as claimed in claim 1, wherein the hull is provided with a plurality of ballast compartments which are symmetrically disposed at two sides of the stone compartments respectively for water inflow or drainage corresponding to stone dumping of the stone compartments so that the stone dumping vessel can achieve ballast balance.

* * * * *